United States Patent Office 3,226,363
Patented Dec. 28, 1965

3,226,363
ORGANO-METALLIC POLYMERIC CONDENSATION PRODUCTS AND METHOD OF PREPARATION
Sydney Arthur Giddings, New Canaan, Conn., assignor to American Cyanamid Company, Stamford, Conn., a corporation of Maine
No Drawing. Filed July 10, 1962, Ser. No. 209,295
25 Claims. (Cl. 260—47)

This invention relates broadly to polymeric (both linear and cross-linked) condensation products and, more particularly, to organo-metallic polymeric condensation products and to a method of making the same. Still more particularly the invention is concerned with polymeric condensation products of (1) a compound represented by the general formula (I)

wherein Cp represents a radical selected from the group consisting of cyclopentadienyl and the lower alkyl-substituted cyclopentadienyl radicals and X represents a halogen having an atomic number greater than 9 (i.e., chlorine, bromine or iodine) and (2) polyfunctional (more particularly difunctional) reactant material represented by the general formula (II)      

wherein Z represents a divalent radical selected from the group consisting of divalent hydrocarbon radicals, divalent halohydrocarbon radicals, divalent hydrocarbon-substituted silicon radicals, and the bisphenylene sulfonyl radical, and each R represents a member of the group consisting of —OH, —SH, —COOH and —OM, —SM and —COOM, where M represents a salt-forming cation. The reactants of (1) and (2) are employed in approximately equal molar proportions. By "approximately" it is meant that there may be used either equal molar proportions of the reactants or a slight molar excess, e.g., from 0.01% to 10 mole percent, of either one of the reactants over the other.

No pertinent prior art is known. In my Patent No. 3,030,394, dated April 17, 1962, relating to cyclopentadienyl(hydrocarbon-siloxy)titanium compounds are disclosed and claimed compounds represented by the general formula III)
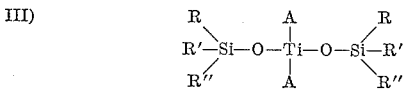

wherein A represents a radical selected from the group consisting of cyclopentadienyl and the lower alkyl-substituted cyclopentadienyl radicals, and each R, R' and R" represents a hydrocarbon radical selected from the group consisting of alkyl radicals containing from 1 to 8 carbon atoms, inclusive, unsubstituted phenyl radical and lower alkyl-substituted phenyl radicals. In my Patent No. 3,030,- 395 relating to cyclopentadienyl(hydrocarbo-thio)titanium compounds, also dated April 17, 1962, are disclosed and claimed compounds represented by the general formula (IV)

wherein Cp represents a radical selected from the group consisting of cyclopentadienyl and the lower alkyl-substituted cyclopentadienyl radicals; R represents a monovalent hydrocarbon radical wherein any unsaturation is solely double-bonded; A represents a monovalent substituent selected from the group consisting of (a) radicals represented by —S—R where R has the same meaning as given above and (b) a halogen having an atomic number greater than 9; and B represents a monovalent substituent selected from the group consisting of those defined under (A) and, in addition, a radical represented by Cp and which has the same meaning as given above.

Both of my aforementioned U.S. Patents 3,030,394 and 3,030,395 involve the preparation of monomeric or simple compounds wherein at least one cyclopentadienyl radical or a lower alkyl-substituted cyclopentadienyl radical is bonded directly to a titanium atom. However, to the best of my knowledge and belief it was not known or suggested prior to the instant invention that polymeric condensation products containing the titanium→cyclopentadienyl (or lower alkyl-substituted cyclopentadienyl) group could be obtained without cleavage of the said group during an attempted preparation.

Illustrative examples of lower alkyl-substituted cyclopentadienyl radicals which, in addition to an unsubstituted cyclopentadienyl radical, are represented by Cp in Formula I are the monomethyl-, dimethyl-, trimethyl- and tetramethylcyclopentadienyl radicals, and the mono- and poly- (i.e., di-, tri- and tetra-) ethyl-, propyl-, isopropyl-, n-butyl-, isobutyl-, sec.-butyl-, n-amyl-, isoamyl-, etc., cyclopentadienyl radicals.

Illustrative examples of divalent radicals represented by Z in Formula II are: divalent hydrocarbon radicals, more particularly divalent aliphatic hydrocarbon radicals, e.g., methylene, ethylene, propylene (trimethylene), propenylene, butylene, isobutylene, pentylene, isopentylene, etc., including divalent cycloaliphatic hydrocarbon radicals, e.g., cyclopentylene, cyclopentenylene, cyclohexylene, cyclohexenylene, cycloheptylene, cycloheptenylene, etc.; divalent aromatic hydrocarbon radicals, e.g., phenylene, xenylene, naphthylene, etc.; divalent aliphatic-substituted aromatic hydrocarbon radicals, e.g., 2,4-tolylene, ethyl 2,5-phenylene, isopropyl-3,4-phenylene, 1-butyl-2,4-naphthylene, etc.; divalent aromatic-substituted aliphatic hydrocarbon radicals, e.g., phenylethylene, phenylpropylene, naphthylisobutylene, xylylene, alpha-(4-tolylene) beta'-butyl, etc.; radicals that may be classed either as divalent aliphatic-substituted aromatic or divalent aromatic - substituted - aliphatic - hydrocarbon radicals, e.g., 4-alpha-tolylene, 3-beta-phenyleneethyl, 4-alpha-xylylene, 2-gamma-phenylenebutyl, etc.; divalent halo- (i.e., chloro-, bromo-, iodo- and fluoro-) hydrocarbon radicals corresponding to the divalent hydrocarbon radicals given above by way of example; the diphenyl silanyl radical and the bisphenylene sulfonyl radical.

Illustrative examples of salt-forming cations represented by M in the groupings —OM, —SM and —COOM are any of the alkali metals (i.e., sodium, potassium, cesium, lithium, rubidium), ammonium, polyvalent metals (e.g., calcium, strontium, barium, magnesium, zinc, etc.), salt-forming cations derived from organic bases such as, for instance, mono-, di- and trimethyl, -ethyl, -propyl, -butyl and -amyl through -octyl amines (both normal and isomeric forms), mono-, di- and triethanol amines, as well as other higher aliphatic and hydroxy-aliphatic amines, guanylurea, guanidine, hydroxyethylguanidine, pentamethylene guanidine, biguanide, aryl amines, e.g., aniline, etc., aralkyl amines, e.g., benzyl amine, etc., alkaryl amines, e.g., toluidine, etc., pyridine, piperidine and the various substituted pyridines and piperidines, the strongly basic quaternary ammonium hydroxides (e.g., tetramethyl-, tetraethyl-, tetrapropylammonium hydroxides, etc.), the various tetralkanolammonium hydroxides (e.g., tetraethanolammonium hydroxide, tetrapropanolammonium hydroxide, tetrabutanolammonium hydroxide, etc.), the various benzyltrialkylammonium hydroxides (e.g., benzyltrimethylammonium hydroxide, benzyltriethylammonium hydroxide, etc.), and others that either will be apparent to those skilled in the art from the foregoing illustrative examples or can be ascertained by routine experimentation.

The present invention is based on my discovery that polymeric (both linear and cross-linked) condensation products of the kind with which this invention is concerned can be obtained as broadly described in the first paragraph of this specification and more fully hereinafter. The reaction between the compound of the kind embraced by Formula I and the polyfunctional, specifically difunctional, reactant material of the kind embraced by Formula II is carried out in the presence of an acceptor of the halogen represented by X (i.e., chlorine, bromine or iodine), when R in Formula II represents —OH, —SH or —COOH. As has been indicated hereinbefore, the aforementioned reactants are employed in approximately equal molar proportions, and at the end of the reaction period the polymeric condensation product is isolated from the resulting reaction mass.

Illustrative examples of hydrohalide acceptors that can be used are the various tri-(hydrocarbon)amines, including the trialkyl amines, e.g., trimethyl through trioctyl, etc., amines, triarylamines, e.g., triphenylamine, trinaphthylamine, etc., trialkarylamines, e.g., tritolylamine, trixylylamine, etc., triaralkylamines, e.g., tribenzylamine, triphenylethylamine, etc.

The reaction is ordinarily effected under anhydrous conditions and at temperatures ranging from ambient temperature, more particularly room temperature (e.g., 20°–30° C.), up to the boiling point of the reaction mass at atmospheric pressure but below the decomposition point of the reactants and of the reaction product.

The reaction between the defined reactants is usually carried out in the presence of an acceptor of the halogen represented by X in Formula II (i.e., chlorine, bromine or iodine) when R in the formula R—Z—R (Formula II) represents a member of the group consisting of —OH, —SH and —COOH.

It is desirable that the reaction between the primary reactants be effected under anhydrous conditions while the reactants are contained in a liquid, inert (substantially completely inert), anhydrous (substantially completely anhydrous), reaction medium. By "inert" or "substantially completely inert", anhydrous, liquid reaction medium is meant one which is so inert or nonreactive toward the reactants and the reaction product that it will not adversely affect the course of the reaction or the constitution of the reaction product. By "anhydrous" or "substantially completely anhydrous" in the foregoing sentences is meant one which contains no more than a trace of water, and by "liquid reaction medium" is meant one which is liquid at the temperature and pressure employed in effecting the reaction. In other words, the inert, anhydrous, liquid, reaction medium in which the reaction is preferably effected may or may not be a liquid at ambient (room) temperature or at any other temperature below the reaction temperature. Preferably the liquid reaction medium employed is one which is volatile (volatilizable) without decomposition.

Illustrative examples of inert, anhydrous, liquid, reaction media that can be employed in practicing the present invention are benzene, toluene, xylene, pentane, hexane, heptane, octane, nonane, decane, dodecane, tetradecane, hexadecane, tetrahydrofuran, tetrahydro-2-methylfuran, m-dioxane (1,3-dioxane), p-dioxane (1,4-dioxane), pentamethylene oxide, 2-methyl-1,3-dioxolane, N-methylmorpholine, N-ethylmorpholine, 2,6-dimethylmorpholine, and the various aliphatic ethers, e.g., diethyl ether, dipropyl ether, dibutyl ether, diamyl ether, dihexyl ether, diheptyl ether, diglycoldimethyl ether, etc. Other examples include the commercially available petroleum ethers and the various halogenated hydrocarbons e.g., methylene dichloride, methylene dibromide, ethylene dichloride, ethylene dibromide, 1-bromo-2-chloroethane, 1,1 - dichloroethane, 1,1 - dibromoethane, 1,1,2,2 - tetrachloroethane, 1,1,2,2 - tetrabromoethane, 1,1,1,2 - tetrachloroethane, 1,1,1,2 - tetrabromoethane, 1 - bromo - 2 - chloropropane, 2-bromo-1-chloropropane, 1,1-dichloropropane, 1,2-dichloropropane, 1,3-dichloropropane, 2,2-dichloropropane, 1,1-dibromopropane, 1,2 - dibromopropane, 1,3-dibromopropane, 2,2-dibromopropane, 1,2-dibromo-2-methylpropane, 1,2,3 - tribromopropane, 1,2,3-trichloropropane, 1,5-dichloropentane, etc.

The amount of inert, anhydrous, liquid, reaction medium employed may be varied as described or as conditions may require, but ordinarily the amount thereof is such that the reactants constitute from about 1% to about 20% by weight thereof.

If desired an excess of liquid hydrohalide acceptor, more particularly a liquid tri-(hydrocarbon)amine such as, for example, triethylamine or other liquid trialkylamine, can be used in lieu of an inert, anhydrous liquid reaction medium of the kind described above.

The temperature at which the reaction is effected is usually ambient temperature (more particularly room temperature), that is, in the absence of applied heat or only such heat as may be necessary to convert the reaction medium comprising the inert, liquid component thereof to liquid state if it is not already in such state. A maximum temperature of reaction up to the decomposition temperature of the starting reactants and of the reaction product is not precluded. Ordinarily, however, the reaction is carried out at the lowest possible temperature that will provide maximum yield in minimum time. Such a temperature is usually within the range of from about 20° C. up to the boiling or reflux temperature of the reaction mass at atmospheric pressure. Superatmospheric pressures can be employed when it is desired to effect the reaction at a temperature above the boiling temperature of the reaction mass at atmospheric pressure.

At the end of the reaction period the polymeric condensation product can be utilized, if desired, in the solvent or diluent in which the reaction was carried out, e.g., in paint, coating, adhesive, or other compositions; or it can be isolated from the reaction mass by any suitable means or combination of means, e.g., by filtration, centrifuging, decantation, etc. Thereafter, the isolated product can be purified, if desired, e.g., by washing with petroleum ether or other inert, organic liquid.

In order that those skilled in the art may better understand how the present invention can be carried into effect, the following examples are given by way of illustration and not by way of limitation. All parts and percentages are by weight unless otherwise stated.

*Example 1*

The di-piperidinium salt of perfluoroglutaric acid (20.52 g.; 0.05 mole) is caused to react with bis(cyclopentadienyl)titanium dichloride (12.45 g.; 0.05 mole) in 250 ml. of anhydrous toluene by heating under reflux at the boiling temperature of the reaction mass for 2 hours. The resulting reaction mass is filtered while still hot to isolate the crude polymeric condensation product, and the piperidinium chloride component thereof is extracted with cold water. The polymeric condensation product (29.5 g.) is an orange-colored powder which cannot be melted and is only very slowly soluble in acetone. It is particularly useful as a pigment.

*Example 2*

Same as in Example 1 with the exception that, instead of bis(cyclopentadienyl)titanium dichloride, there is employed an equivalent amount of bis(cyclopentadienyl)titanium dibromide. Similar results are obtained.

Example 3

Same as in Example 1 with the exception that, instead of bis(cyclopentadienyl)titanium dichloride, there is used an equivalent amount of bis(methylcyclopentadienyl)titanium dichloride. Similar results are obtained.

Example 4

Bis(cyclopentadienyl)titanium dichloride (24.9 g.; 0.1 mole), 16.61 g. of terephthalic acid (0.1 mole), 100 ml. of triethylamine and 900 ml. of methylene chloride are heated together under reflux at the boiling temperature of the reaction mass for 60 hours. A yellow precipitate separates and is filtered from the hot reaction mass. No further treatment of the product is necessary in view of the solubility of the triethylamine hydrochloride, produced as a by-product of the reaction, in the methylene chloride solvent employed. The yield of isolated polymeric condensation product amounts to 33.6 g. It is resistant to heat and is insoluble in water, 5% aqueous hydrochloric acid, 5% aqueous sodium hydroxide, and in conventional organic solvents, e.g., ether, acetone, tetrahydrofuran, hexane, carbon tetrachloride, ethanol, benzene, acetonitrile, dimethylformamide, chloroform, methanol, methyl ethyl ketone, dimethylsulfoxide, formic acid, dioxane, nitroethane, pyridine, chlorobenzene, Cellosolve® acetate, $C_7$ fluoro alcohol, ethylene glycol, cresol, and nitrobenzene.

Example 5

Same as in Example 4 with the exception that, instead of bis(cyclopentadienyl)titanium dichloride, there is employed an equivalent amount of bis(n-amylcyclopentadienyl)titanium diiodide. Similar results are obtained.

Example 6

This example illustrates the use of a dicarboxylic acid reactant which additionally contains two —OH groups, one on each of the two —$C_6H_3$ nuclei that are present in the dicarboxylic acid reactant. Using approxitamely equal molar proportions of reactants, the condensation reaction proceeds preferentially through the —COOH groups, leaving the —OH groups in the polymer chain where they are available for reaction, if desired, with a modifying reactant or with an additional quantity of bis(cyclopentadienyl)titanium dichloride.

Bis(cyclopentadienyl)titanium dichloride (26.9 g.; 0.10 mole), 28.83 g. (0.10 mole) 5,5′-methylene disalicylic acid, 100 ml. of triethylamine and 900 ml. of methylene chloride are heated together under reflux at the boiling temperature of the reaction mass for 20 hours. Thereafter, the polymer that has formed is filtered from the hot reaction mass. The polymeric condensation product which is thus isolated (49.7 g. of dried material) is a brown, stable material, which is substantially insoluble in the ordinary organic solvents, including those mentioned under Example 4.

Example 7

Same as in Example 6 with the exception that, instead of 100 ml. of triethylamine, there is used 100 ml. of tri-n-amylamine. Similar results are obtained.

Example 8

Bis(cyclopentadienyl)titanium dichloride (24.9 g.; 0.10 mole), 4,4′-bis-(hydroxyphenyl)sulfonyl (23.6 g.; 0.10 mole), 100 ml. of triethylamine and 1500 ml. of methylene chloride are heated together under reflux at the boiling temperature of the reaction mass for 6 hours, and then filtered while still hot. The polymeric condensation product prepared and isolated in this manner is orange in color. It is only slightly soluble in acetone, tetrahydrofuran and dimethylformamide. The yield of dried product amounts to 22.6 g.

Example 9

Same as in Example 8 with the exception that instead of 0.1 mole of bis(cyclopentadienyl)titanium dichloride there is used 0.1 mole of bis(dimethylcyclopentadienyl)titanium dibromide, and instead of 100 ml. of triethylamine there is employed 100 ml. of tri-n-propyl amine. Similar results are obtained.

Example 10

Bis(cyclopentadienyl)titanium dichloride (24.9 g.; 0.10 mole), bisphenol-A (2,2-bis-(4-hydroxyphenyl)propane) (22.83 g.; 0.10 mole), 100 ml. of triethylamine and 900 ml. of methylene chloride are heated together under reflux at the boiling temperature of the reaction mass for 20 hours. The polymeric condensation product obtained by filtering the hot reaction mass is orange in color. The yield of dried product amounts to 33.6 g. Like the products of the preceding examples (and, also, those which follow), it is suitable for use as a pigment.

Example 11

Same as in Example 10 with the exception that, instead of using 22.83 g. (0.10 mole) of bisphenol-A, there is employed 54.40 g. (0.10 mole) of tetrabromo bisphenol-A (2,2 - bis-(3,5-dibromo-4-hydroxyphenyl)propane. The yield of dried polymeric condensation product amounts to 53.5 g. It is slightly soluble in a wide range of conventional organic solvents, e.g., ether, acetone, tetrahydrofuran, carbon tetrachloride, benzene, acetonitrile, dimethylformamide, chloroform, methyl ethyl ketone, dimethylsulfoxide, dioxane, nitroethane, pyridine, chlorobenzene, Cellosolve® acetate, cresol and nitrobenzene.

Example 12

The di-sodium salt of 1,6-hexane dithiol is first prepared by heating 11.0 g. (0.07 mole) of 1,6-hexane dithiol with 4.6 g. (0.2 mole) of metallic sodium in anhydrous toluene under reflux at the boiling temperature of the reaction mass for 16 hours. There is then added to the reaction mass 18.22 g. (0.07 mole) of bis(cyclopentadienyl)titanium dichloride. An immediate color change to magenta is noted. The reaction mass is refluxed for an additional 5 hours. Unreacted sodium and sodium chloride are then filtered off, and the polymeric condensation product is obtained by evaporating the filtrate. The yield of dried product (M.P. about 200° C.) amounts to 11.0 g.

Example 13

Bis(cyclopentadienyl)titanium dichloride (24.9 g.; 0.10 mole) and the di-piperidinium salt of 1,5-naphthalene dithiol (36.26 g.; 0.10 mole) in 1 liter of xylene are heated together at about 50° C. for about 16 hours, followed by heating together under reflux at the boiling temperature of the reaction mass for 1 hour. At the end of the reaction period, the reaction mass is filtered while still hot. The salt is removed from the isolated solid by extracting with cold water. The yield of the dried, purified polymeric condensation product amounts to 18.1 g. It is a magenta powder which is resistant to heat and is insoluble in the conventional organic solvents, more particularly those set forth under Example 4. It is also insoluble in water, 5% aqueous hydrochloric acid and 5% aqueous sodium hydroxide. The polymeric condensation product of this example is suitable for use as a pigment.

Example 14

Bis(cyclopentadienyl)titanium dichloride (31.49 g.; 0.1264 mole), 1,9-nonane dithiol (24.33 g.; 0.1264 mole) and 100 ml. of triethylamine in 900 ml. of anhydrous toluene are heated to 52° C. in 72 hours. The reaction mass is then filtered, and the filtrate is treated with an excess of heptane to precipitate the polymeric condensation product, which is filtered off and dried. The yield of dry polymer amounts to 17.0 g.

*Example 15*

Same as in Example 14 with the exception that, instead of bis(cyclopentadienyl)titanium dichloride, there is used an equivalent molar amount of bis(n-butylcyclopentadienyl)titanium dichloride. Similar results are obtained.

*Example 16*

Bis(cyclopentadienyl)titanium dichloride (24.9 g.; 0.10 mole), 4,4'-diphenylmethane dithiol (23.2 g.; 0.10 mole) and 100 ml. of triethylamine in 900 ml. of methylene chloride are stirred together for about 16 hours at room temperature (about 20°–30° C.) and thereafter heated under reflux at the boiling temperature of the reaction mass for about 2 hours. At the end of the reaction period the reaction mass is evaporated to dryness, and the by-product salt extracted with cold water. The purified polymeric condensation product is magenta in color. The yield of dried product (M.P. about 150° C.) amounts to 17.0 g.

*Example 17*

Same as in Example 16 with the exception that, instead of bis(cyclopentadienyl)titanium dichloride, there is used an equivalent molar amount of bis(triethylcyclopentadienyl)titanium dibromide. Similar results are obtained.

*Example 18*

Exactly the same procedure is followed as described in Example 16 with the exception that 16.03 g. (0.10 mole) of alpha,alpha'-dithiolxylene is employed instead of 24.9 g. of 4,4'-diphenylmethane dithiol. The polymeric condensation product obtained from the reaction melts slightly at 260° C.

*Example 19*

This example illustrates how copolymeric condensation products of the present invention can be prepared.

1,5-naphthalene dithiol (9.615 g.; 0.05 mole) in 500 ml. methylene chloride is added to bis(cyclopentadienyl)-titanium dichloride (20.9 g.; 0.10 mole) and 100 ml. triethylamine in 500 ml. of methylene chloride over a period of 1 hour, under reflux, at the boiling temperature of the reaction mass. The reaction mass is refluxed an additional 30 minutes, yielding an oligomeric condensation product. To the reaction mass is then added 10.82 g. of diphenylsilane diol (0.05 mole) in 500 ml. of methylene chloride over a period of 16 hours. The solvent is evaporated and replaced with 1 liter of benzene. The resulting reaction mass is heated under reflux at the boiling temperature of the reaction mass for about 72 hours.

After filtering the reaction mass the resulting insoluble material is extracted with cold water. The purified copolymeric condensation product is deep magenta in color. The yield of the dried product is 28.5 g.

*Example 20*

A colored pigmented enamel is prepared by grinding together the following ingredients for 18 hours in a pebble mill:

| | Parts |
|---|---|
| Alkyd resin solution [1] | 150.0 |
| Polymeric condensation product of Example 1 (pigment) | 85.0 |
| Polyacrylonitrile (flatting agent) | 15.0 |
| Mineral Spirits (Varsol No. 1) | 50.0 |
| Cobalt naphthenate, see (a). | |
| Calcium naphthenate, see (b). | |

[1] Solution of 35% mineral spirits and 65% of pentaerythritol phthalate polyester, modified with fatty acids of soya bean oil.
(a) 0.04% as metallic cobalt based on the alkyd resin solids.
(b) 0.08% as metallic calcium based on the alkyd resin solids.

The enamel is applied to wall surfaces over a dried wall paint. It dries to a very flat finish. The pigment loading in the enamel of this example is very low in comparison with the heavily pigmented products normally made for coating applications where a flat enamel finish is wanted.

I claim:

1. A polymeric condensation product of (1) a compound represented by the general formula

wherein Cp represents a radical selected from the group consisting of cyclopentadienyl and the lower alkyl-substituted cyclopentadienyl radicals and X represents a halogen having an atomic number greater than 9 and (2) difunctional reactant material represented by the general formula

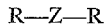

wherein Z represents a divalent radical selected from the group consisting of divalent hydrocarbon radicals, divalent halohydrocarbon radicals, the diphenyl silanyl radical, any unsaturation in said divalent radicals being solely of the double bond type, and the bisphenylene sulfonyl radical, and each R represents a member of the group consisting of —OH, —SH, —COOH and —OM, —SM and —COOM where M represents a salt-forming cation, the reactants of (1) and (2) being employed in approximately equal molar proportions and the reaction between (1) and (2) being conducted in an inert liquid medium in the presence of a hydrogen halide acceptor where R in (2) is —OH, —SH or —COOH.

2. A polymeric condensation product as in claim 1, wherein (1) is bis(cyclopentadienyl)titanium chloride, Z of (2) is a divalent hydrocarbon radical and R of (2) is —OH.

3. A polymeric condensation product as in claim 2 wherein the reactant of (2) is 2,2-bis-(4-hydroxyphenyl) propane.

4. A polymeric condensation product as in claim 1 wherein (1) is bis(cyclopentadienyl)titanium chloride, Z of (2) is a divalent halohydrocarbon radical and R of (2) is —OH.

5. A polymeric condensation product as in claim 4 wherein the reactant of (2) is 2,2-bis-(3,5-dibromo-4-hydroxyphenyl) propane.

6. A polymeric condensation product as in claim 1 wherein (1) is bis(cyclopentadienyl) titanium chloride, Z of (2) is a divalent hydrocarbon radical and R of (2) is —SH.

7. A polymeric condensation product as in claim 1 wherein (1) is bis(cyclopentadienyl)titanium chloride, Z of (2) is a divalent hydrocarbon radical and R of (2) is —SM where M is an alkali metal.

8. A polymeric condensation product as in claim 1 wherein (1) is bis(cyclopentadienyl)titanium dichloride, Z of (2) is a divalent hydrocarbon radical and R of (2) is —SM where M is a piperidinium radical.

9. A polymeric condensation product as in claim 1 wherein (1) is bis(cyclopentadienyl)titanium dichloride, Z of (2) is a divalent hydrocarbon radical and R of (2) is —COOH.

10. A polymeric condensation product as in claim 9 wherein (2) is terphthalic acid.

11. A composition as in claim 9 wherein (2) is 5,5'-methylene disalicylic acid.

12. A polymeric condensation product as in claim 1 wherein (1) is bis(cyclopentadienyl)titanium chloride, Z of (2) is a divalent halohydrocarbon radical and R of (2) is —COOH.

13. A polymeric condensation product as in claim 1 wherein (1) is bis(cyclopentadienyl)titanium chloride, Z of (2) is a divalent halohydrocarbon radical and R of (2) is —COOM.

14. The polymeric condensation product of claim 13 where (2) is the di-piperidinium salt of perfluoroglutaric acid.

15. A polymeric condensation product as in claim 1 wherein (1) is bis(cyclopentadienyl)titanium chloride, Z of (2) is bisphenylene sulfonyl and R of (2) is —OH.

16. A composition as in claim 15 wherein the compound of (2) is 4,4'-bis(hydroxyphenyl)sulfonyl.

17. A polymeric condensation product of (1) diphenylsilane diol with (2) an oligomeric condensation product of (a) bis(cyclopentadienyl)titanium dichloride and (b) naphthalene dithiol, the diol of (1) and the dithiol of (b) being used in approximately equal molar proportions, and the dichloride of (a) being employed in approximately equal molar proportions with the molar amount of the diol of (1) plus the dithiol of (b), the reaction between (a) and (b) to form (2) and the reaction between (1) and (2) being conducted in an inert liquid medium in the presence of a hydrogen halide acceptor.

18. A polymeric condensation product as in claim 6 wherein (2) is 1,9-nonane dithiol.

19. A polymeric condensation product as in claim 7 wherein (2) is the disodium salt of 1,6-hexane dithiol.

20. A polymeric condensation product as in claim 8 wherein (2) is the di-(piperidinium) salt of 1,5-naphthalene diol.

21. A polymeric condensation product as in claim 12 wherein (2) is perfluoroglutaric acid.

22. A polymeric condensation product as in claim 13 where (2) is the di-sodium salt of perfluoroglutaric acid.

23. The method of preparing a polymeric condensation product which comprises:
(I) reacting together under anhydrous conditions and in an inert, liquid reaction medium
(A) a compound represented by the general formula

wherein Cp represents a radical selected from the group consisting of cyclopentadienyl and the lower alkyl-substituted cyclopentadienyl radicals, the diphenyl silanyl radical, any unsatura-atomic number greater than 9, and
(B) difunctional reactant material represented by the formula

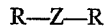

wherein Z represents a divalent radical selected from the group consisting of divalent hydrocarbon radicals, divalent halohydrocarbon radicals, the diphenyl silanyl radical, any unsaturation in said divalent radicals being solely of the double bond type, and the bisphenylene sulfonyl radical, and each R represents a member of the group consisting of —OH, —SH, —COOH and —OM, —SM and —COOM where M represents a salt-forming cation,
the reactants of (A) and (B) being employed in approximately equal molar proportions, and the reaction between the aforesaid reactants being carried out in the presence of a hydrogen halide acceptor when R in the formula R—Z—R represents —OH, —SH or —COOH; and
(II) isolating the polymeric condensation product that is formed from the resulting reaction mass.

24. A method as in claim 23 wherein the hydrogen halide acceptor is a tri-(hydrocarbon) amine selected from the group consisting of trialkyl amines, triaryl amines, trialkaryl amines and triaralkyl amines.

25. A method as in claim 24 wherein said tri-(hydrocarbon)amine is triethyl amine.

References Cited by the Examiner

UNITED STATES PATENTS

| | | | |
|---|---|---|---|
| 2,821,512 | 1/1958 | Haven | 260—429 |
| 2,943,073 | 6/1960 | Brantley | 260—41.5 |
| 2,952,697 | 9/1960 | Gorsich | 260—429 |
| 2,983,741 | 5/1961 | Brantley | 260—429 |
| 3,030,394 | 4/1962 | Giddings | 260—429 |
| 3,057,822 | 10/1962 | Rust et al. | 260—46.5 |

WILLIAM H. SHORT, *Primary Examiner.*

UNITED STATES PATENT OFFICE
CERTIFICATE OF CORRECTION

Patent No. 3,226,363                          December 28, 1965

Sydney Arthur Giddings

It is hereby certified that error appears in the above numbered patent requiring correction and that the said Letters Patent should read as corrected below.

Column 4, line 11, for "described" read -- desired --; column 7, line 42, for "(20.9 g." read -- (24.9 g. --; column 8, line 65, for "terphthalic" read -- terephthalic --; column 10, line 2, strike out "the diphenyl silanyl radical, any unsatura-" and insert instead -- and X represents a halogen having an --.

Signed and sealed this 6th day of December 1966.

(SEAL)
Attest:

ERNEST W. SWIDER                          EDWARD J. BRENNER
Attesting Officer                                Commissioner of Patents